United States Patent
Cannon et al.

(10) Patent No.: US 11,277,488 B2
(45) Date of Patent: Mar. 15, 2022

(54) METHOD AND APPARATUS FOR DOWNLOADING AN APPLICATION TO AN EDGE COMPUTING SYSTEM

(71) Applicant: Veea Systems Ltd., Bath (GB)

(72) Inventors: Mark Joseph Cannon, Gloucestershire (GB); Nicholas Jelbert, Bath (GB)

(73) Assignee: Veea Systems Ltd., Bath (GB)

( * ) Notice: Subject to any disclaimer, the term of this patent is extended or adjusted under 35 U.S.C. 154(b) by 80 days.

(21) Appl. No.: 15/838,672

(22) Filed: Dec. 12, 2017

(65) Prior Publication Data
US 2018/0167483 A1    Jun. 14, 2018

(30) Foreign Application Priority Data
Dec. 12, 2016 (GB) .................................. 1621081

(51) Int. Cl.
*H04L 12/24* (2006.01)
*H04L 41/0803* (2022.01)
(Continued)

(52) U.S. Cl.
CPC .......... *H04L 67/2842* (2013.01); *G06F 9/445* (2013.01); *H04L 67/2804* (2013.01)

(58) Field of Classification Search
CPC . H04L 67/2842; H04L 67/2804; G06F 9/445; G06F 9/50; G06F 8/60
(Continued)

(56) References Cited

U.S. PATENT DOCUMENTS 8,958,780 B2 * 2/2015 Smith .................. H04L 67/303
455/414.3
9,635,580 B2 * 4/2017 Sundaram ......... H04W 28/0226
(Continued)

FOREIGN PATENT DOCUMENTS

| CN | 105843685 | 8/2016 |
|----|-----------|--------|
| EP | 2782318 | 9/2014 |
| EP | 2829984 | 1/2015 |

OTHER PUBLICATIONS

European Patent Application No. 17206464.4-1221; European Extended Search Report dated May 9, 2018, 13 pages.
(Continued)

*Primary Examiner* — Moustafa M Meky
*Assistant Examiner* — Elizabeth Kassa
(74) *Attorney, Agent, or Firm* — Fitch, Even, Tabin & Flannery LLP (57) ABSTRACT

An edge computing system comprises an application store, an edge server and a cloud computing system comprising a backend server. The edge server is configured to receive an application from the application store with additional information defining capabilities of the edge server that are required for the application to run on the edge server and/or capabilities of devices connected to the edge server. The edge server determines whether the application can run, and indicates the result to the application store. The edge server keeps a record of applications that can start to run and/or continue to run, when the edge server is or becomes disconnected from the cloud computing system. The application store keeps records of successful application downloads, and of edge servers that indicated they could not run applications.

14 Claims, 9 Drawing Sheets (51) Int. Cl.
*H04L 67/568* (2022.01)
*H04L 67/561* (2022.01)
*G06F 9/445* (2018.01)

(58) Field of Classification Search
USPC ........................................................ 709/203
See application file for complete search history.

(56) References Cited

U.S. PATENT DOCUMENTS

| | | | |
|---|---|---|---|
| 10,445,142 B2* | 10/2019 | Chintalapally | G06F 9/5044 |
| 10,884,808 B2* | 1/2021 | Chintalapally | H04L 63/08 |
| 2006/0015849 A1 | 1/2006 | Polozoff | |
| 2006/0256130 A1* | 11/2006 | Gonzalez | G06F 16/958 |
| | | | 345/619 |
| 2007/0067440 A1 | 3/2007 | Bhogal | |
| 2008/0201426 A1 | 8/2008 | Darcie | |
| 2011/0179148 A1* | 7/2011 | Siripunkaw | H04L 67/34 |
| | | | 709/220 |
| 2011/0185043 A1* | 7/2011 | Zeller | G06F 9/44521 |
| | | | 709/219 |
| 2011/0320520 A1 | 12/2011 | Jain | |
| 2012/0246291 A1* | 9/2012 | Wong | G06Q 30/0603 |
| | | | 709/224 |
| 2013/0254258 A1* | 9/2013 | Agarwalla | H04L 29/06 |
| | | | 709/202 |
| 2013/0346465 A1 | 12/2013 | Maltz | |
| 2014/0095894 A1* | 4/2014 | Barton | G06F 21/72 |
| | | | 713/190 |
| 2014/0115128 A1 | 4/2014 | Myrberg | |
| 2014/0298402 A1* | 10/2014 | Lang | H04W 12/0027 |
| | | | 726/1 |
| 2014/0317293 A1* | 10/2014 | Shatzkamer | G06F 9/45558 |
| | | | 709/226 |
| 2014/0317596 A1* | 10/2014 | Bou | G06F 9/44536 |
| | | | 717/106 |
| 2016/0316310 A1* | 10/2016 | Strom | H04W 4/50 |
| 2016/0370784 A1* | 12/2016 | Gruenewald | G06F 9/44521 |
| 2017/0060574 A1* | 3/2017 | Malladi | G06F 8/70 |
| 2017/0264525 A1* | 9/2017 | Falk | G06F 9/455 |
| 2017/0277909 A1* | 9/2017 | Kraemer | G06F 21/6245 |
| 2017/0337070 A1* | 11/2017 | Lee | G06F 12/0868 |
| 2018/0139308 A1* | 5/2018 | Andrews | G06F 11/1464 |

OTHER PUBLICATIONS

European Patent Application No. 17206468.5-1221; European Extended Search Report dated May 8, 2018, 9 pages.
British Patent Application No. GB1621081.7; Combined Search and Examination Report Under Sections 17 and 18(3); dated Jun. 2, 2017.
Hegyi et al.; Application Orchestration in Mobile Edge Cloud; Placing of IoT Applications to the Edge; 2016 IEEE 1st International Workshops on Foundations and Applications of Self-*Systems; Sep. 12-16, 2016; pp. 230-235; DOI-10.1109/FAS-W.2016.56.
Amento et al.; FocusStack: Orchestrating Edge Clouds Using Location-Based Focus Attention; 2016 IEEE/ACM Symposium on Edge Computing; pp. 179-191; Oct. 27-28, 2016; DOI:10.1109/SEC.2016.22.
Definition of Fog Computing; https://www.openfogconsortium.org/resources/#definition-of-fog-computing; Known as early as Dec. 12, 2016.
Multi-Access Edge Computing; ETSI; http://www.etsi.org/technologies-clusters/technologies/mobile-edge-computing; Known as early as Dec. 12, 2016.
European Paent Application No. 17206464.4-1221/3343363; European Extended Search Report dated Sep. 3, 2018, 13 pages.
British Patent Application No. GB1621068.4; Combined Search and Examination Report Under Sections 17 and 18(3); dated Jun. 15, 2017.
European Patent Application No. 17 206 464.4-1203; Communicaiton Pursuant to 94(3) EPC; dated Mar. 3, 2020, 8 pages.
European Patent Application No. 17206468.5-1221; Communication Pursuant to 94(3) EPC; dated Jan. 8, 2020, 7 pages.
U.S. Appl. No. 15/838,644; Notice of Allowance dated Apr. 2, 2021; 20 pages.
European Patent Application No. 17 206 464.4; Examination Report dated Jul. 6, 2021; 15 Pages.
European Patent Application No. 17 206 464.4; Preliminary Opinion of the Examining Division; dated Nov. 12, 2021; 16 pages.

* cited by examiner

| Application | Edge servers having successfully download the application | Edge servers lacking (internal) capability to run the application | Edge servers with device(s) lacking capability for edge server to run the application |
|---|---|---|---|
| 1st Application | Server 001; Server 004. | Server 002; Server 009. | Server 008; Server 012 |
| 2nd Application | Server 001 | Server 002; Server 023 | Server 007 |
| 3rd Application | Server 001; Server 002; Server 016. | Server 005 | Server 027 |

| Application | Can application start when connection to cloud computing system disconnected? | Can application continue to run when connection to cloud computing system becomes disconnected? |
|---|---|---|
| 1st Application | Yes | Yes |
| 2nd Application | No | Yes |
| 3rd Application | No | No |
| 4th Application | Yes | No |

METHOD AND APPARATUS FOR DOWNLOADING AN APPLICATION TO AN EDGE COMPUTING SYSTEM

RELATED APPLICATION

This application claims the benefit of Great Britain Application No. 1621081.7 filed Dec. 12, 2016. The content of this application is fully incorporated herein in its entirety.

TECHNICAL FIELD

The field of the invention is edge computing systems. In particular, the invention concerns the download of applications to edge processing units.

BACKGROUND

A recent development in cloud computing is the use of 'fog' or 'edge' computing. 'Fog' or 'edge' computing relies on moving computing and storage functionality out from the cloud and closer to whatever entities or data are to be managed and processed. Such functionality may be applied, for example, to the 'Internet of Things'. 'Internet of Things', IoT, systems often have a wide variety of equipment designs, each of which may have only limited computing power but yet may produce useful data. Such data often originates from widely spaced locations.

Figure 1A:
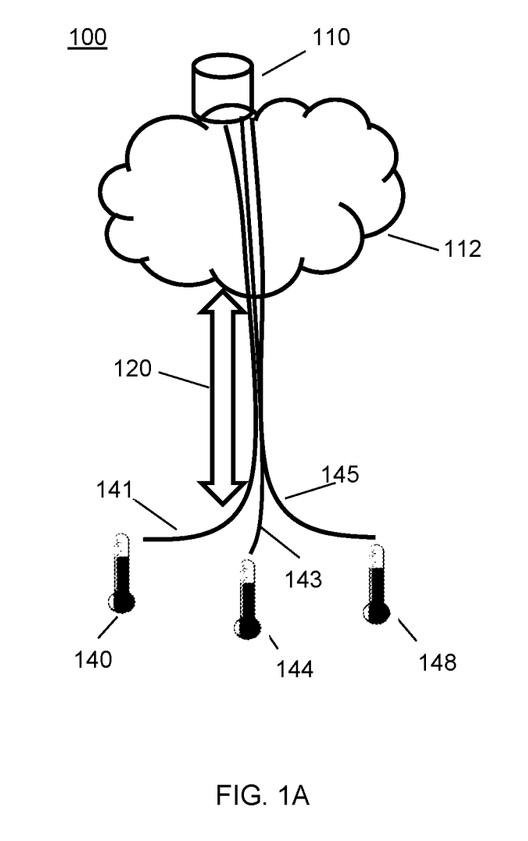
FIG. 1A shows an example of a known cloud computing architecture in schematic form.

Henceforth, the term 'edge' computing will be used to cover computing arrangements that are typically referred to by practitioners either as 'fog' or 'edge' computing. Edge computing is described more fully at:
http://www.etsi.org/technologies-clusters/technologies/mobile-edge-computing
Fog computing is described more fully at:
https://www.openfogconsortium.org/rescources/#definition-of-fog-computing FIG. 1 illustrates known cloud computing systems. In FIG. 1A, an example of a known cloud computing architecture 100 is shown in schematic form. A backend server 110 forms part of a cloud computing system 112. Backend server 110 provides a backend processing function, and may for example be an IoT server. Connection 120 links backend server 110 to first sensor device 140, second sensor device 144 and third sensor device 148.

Connection 120 serves to provide backhaul connectivity, and is generally a direct connection. Thus connection 120 serves to implement a first direct connection 141 to first sensor device 140, a second direct connection 143 to second sensor device 144 and a third direct connection 145 to third sensor device 148. In various different versions of cloud computing architecture 100, the connection 120 may be provided by one or more communication technologies, such as cellular, WiFi or Ethernet.

Figure 1B:
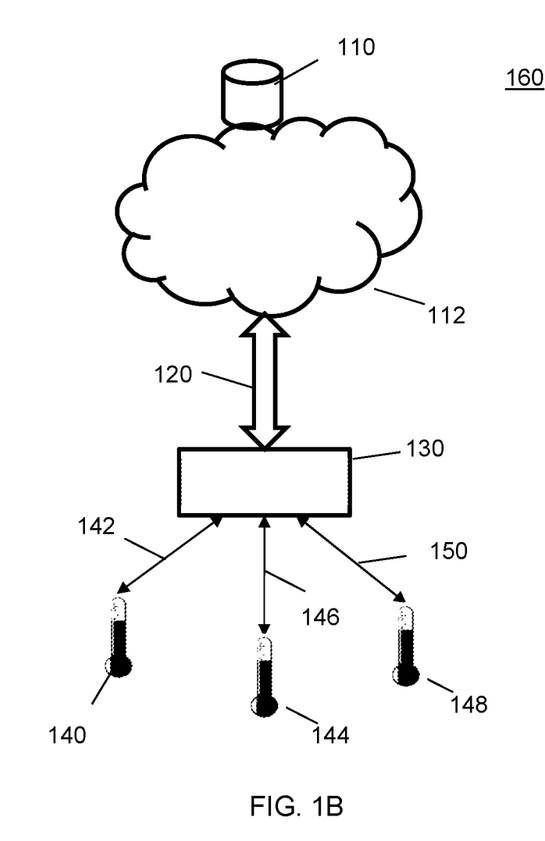
FIG. 1B shows an example of a known edge computing architecture in schematic form.

In FIG. 1B, an example of a known edge computing architecture 160 is shown in schematic form. A backend server 110 forms part of a cloud computing system 112. Connection 120 links backend server 110 to an edge server 130. Connection 120 serves to provide backhaul connectivity. Edge server 130 provides some of the computing and storage functionality from the cloud computing system 112, such as some of the functionality of the backend server 110 of FIG. 1A. Edge server 130 connects to first sensor device 140 via first connection 142, to second sensor device 144 via second connection 146, and to third sensor device 148 via third connection 150. Measurements from first sensor device 140, second sensor device 144 and third sensor device 148 may be temperature measurements. The measurements are initially processed in edge server 130, and then results sent to the backend function represented by backend server 110.

In an illustrative example, the edge processing function 130 may be located in the Radio Access Network of a cellular communications system. First connection 142, second connection 146 and third connection 150 are therefore high bandwidth links with very high availability and low latency. Edge processing function 130, when located in the Radio Access Network of a cellular communications system, may support many other remote devices than the first sensor device 140, second sensor device 144 and third sensor device 148 illustrated in FIG. 1B. Although remote from edge processing function 130, those devices may be part of, for example, enterprise computing systems located in customers' premises. In an alternative example, edge processing function 130 may itself be a mobile device, for example a laptop.

The recognized benefits of the migration to edge computing are as follows: (i) Reduced bandwidth in the backhaul link, i.e. connection 120, to the cloud processing functionality in the backend server 110, which reduces the volume of data that needs to be sent back to the cloud computing system 112; (ii) Reduced latency, because the edge processing function 130 can produce results quickly, due to the close proximity of edge processing function 130 to local control functions; (iii) Improved security. The improved security results from less data being sent to the cloud computing system 112. In addition, rather than having security endpoints on each low power sensor node such as first sensor device 140, as is the case in the architecture 100 of FIG. 1A, the security endpoint is at the edge processing function 130. In all of scenarios (i)-(iii) above, the need for backend server 110 and cloud computing system 112 remains.

SUMMARY OF THE INVENTION

In accordance with a first aspect of the present invention, there is provided an edge computing system in accordance with appended claim 1. In accordance with a second aspect of the present invention, there is provided an application store in accordance with appended claim 6. In accordance with a third aspect of the present invention, there is provided an edge server in accordance with appended claim 11. In accordance with a fourth aspect of the present invention, there is provided a method of operating downloaded applications in accordance with claim 15. In accordance with a fifth aspect of the present invention, there is provided method of downloading applications to an edge server from an application store. The dependent claims provide further steps and features of embodiments.

BRIEF DESCRIPTION OF THE DRAWINGS

Exemplary embodiments of the present invention will now be described, by way of example only, with reference to the accompanying drawings, in which.

DETAILED DESCRIPTION

Edge servers are generic devices that can have many different sorts of sensing/measuring or other IoT devices connected to them. Therefore there are many different types of applications that could run at the edge. These applications can be provided from a central storage location, which may be in a cloud computing system. The invention addresses the situation in which an application is selected for download from a storage location to the edge server.

At a location within a cloud computing platform, a service or application can run agnostically on any node. In contrast, an edge node such as an edge server has characteristics that must match the service or application to be deployed. A user may also want to download an application to multiple edge servers simultaneously. Situations may therefore arise where a decision is taken to download an application on an enterprise-wide basis, i.e. to all owned edge servers.

In addition, some networks have a wireless backhaul connection between an edge server and the cloud computing system. Such a wireless connection, for example to the internet, is inherently unreliable. With a wireless connection, the edge server could be a mobile node, and thus could move out of range.

The invention starts from the realisation that, of all the applications that can run on an edge server, there is a subset that can start to run while the edge server is isolated/cut off from the network. There is also a subset that can continue to run while the edge server is isolated/cut off from the network, which may or may not correspond to the subset that can start to run while the edge server is isolated/cut off. Starting from this realisation, one approach would be to treat each download and application on a case by case basis, but this is a less efficient way to proceed.

The invention allows a download function itself to keep track of which application downloads are possible and/or successful, with each edge server. In addition, the invention utilises the fact that some applications can continue to run on the edge node, even when the edge server is isolated/cut off from the network, and hence has the effect of allowing that subset of applications to continue when the edge server is isolated/cut off. Furthermore, the invention utilises the fact that some applications can start to run on the edge server, even when the edge server is isolated/cut off from the network, and hence has the effect of allowing that subset of applications to start when the edge server is isolated/cut off. With the invention, these subsets of applications are indicated at the time of making the download of the application.

Applying the invention to the example of FIG. 1B, the invention recognizes and utilizes the fact that there is no reason why the edge processing function 130 should not continue to collect the data from first sensor device 140, second sensor device 144 and third sensor device 148, even when the backhaul connection 120 to cloud computing system 112 is not currently operational. Once backhaul connection 120 to cloud computing system 112 is restored, then the application on edge processing function 130 will be able to send aggregated and stored data for processing at backend server 110. On the other hand there could be another application on edge processing function 130 with a different operation, for which it does not make sense to continue to run in isolation, when connection 120 is not available. For example, this could occur when the latency of the data received at backend server 110 is critical.

In summary, the invention identifies and solves two main problems:
(i) How does the controlling function of an application store know if a particular application can be/has been successfully downloaded to a particular edge server?
(ii) How does an edge server know whether a particular application that has been downloaded to it is capable of starting or continuing to run in isolation?

The present invention will now be described in terms of specific exemplary embodiments. However, it will be appreciated that the present invention may be embodied in other types of edge computing systems. The invention is particularly relevant to those that download applications to edge nodes from an application store. In the embodiments described below, an edge server is used as an example of edge processing functionality, which may be provided by other edge processing devices than a server.

Figure 2:
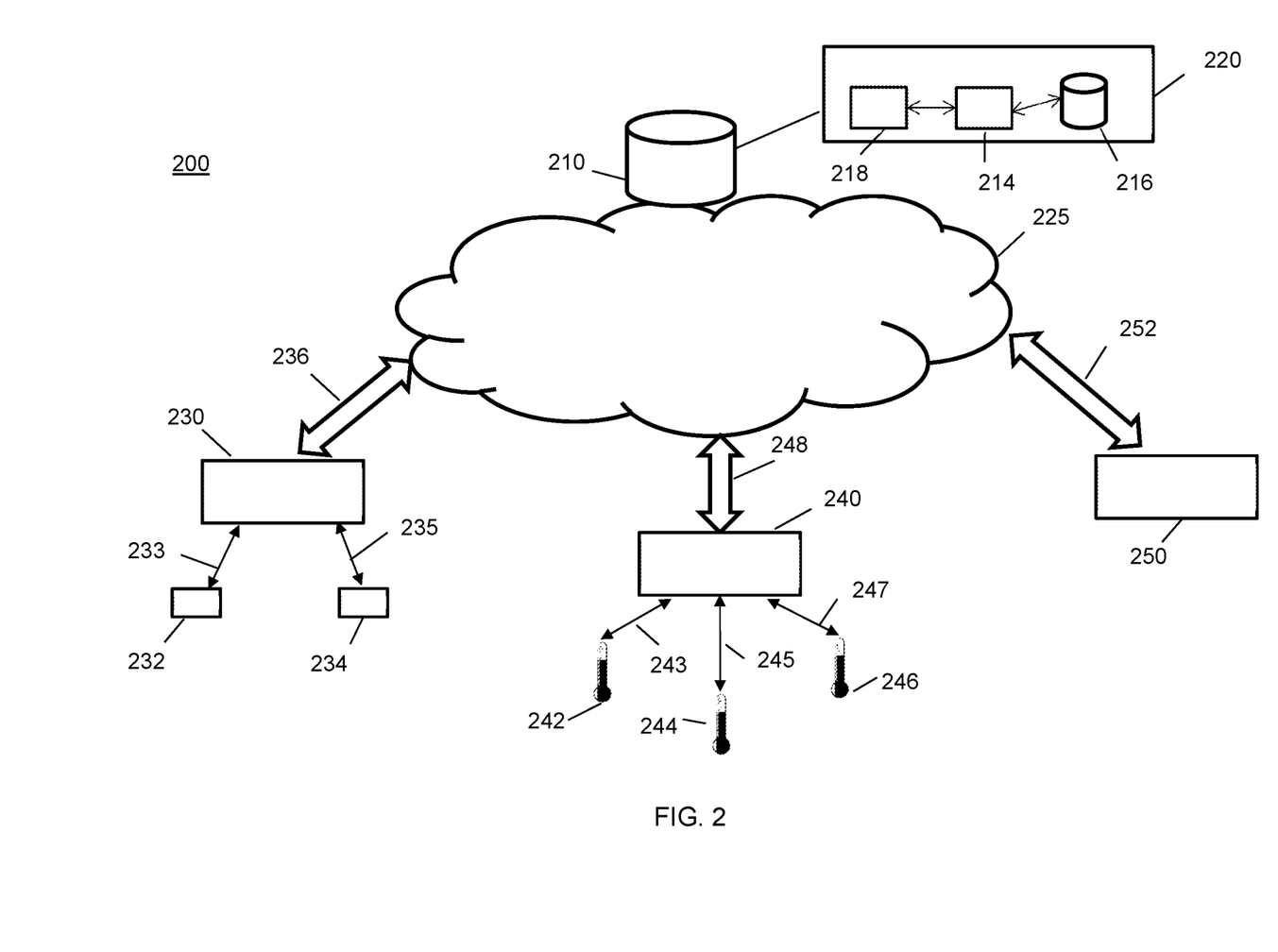
FIG. 2 illustrates an edge computing system, in accordance with an embodiment of the present invention.

Referring to FIG. 2, an example of a functional block diagram of an edge computing system 200 is provided.

Backend server 210 forms part of cloud computing system 225. Application store 220 is illustrated as being connected to backend server 210. However, application store 220 could be located elsewhere in edge computing system 200, or alternatively within backend server 210. Application store 220 comprises a processor 214, memory 216 and a communication processor 218. Communication processor 218 communicates with backend server 210. Memory 216 stores applications. Memory 216 may also store the information described subsequently in connection with FIG. 6.

First edge server 230 links to cloud computing system 225 via first connection 236. First edge server 230 also links to first device 232 via first connection 233 and to second device 234 via second connection 235. First device 232 and second device 234 may be sensors, video devices, retail equipment or other forms of peripheral device.

Second edge server 240 links to cloud computing system 225 via second connection 248. Second edge server 240 also links to first temperature sensor device 242 via third connection 243, to second temperature sensor device 244 via fourth connection 245, and to third temperature sensor device 246 via fifth connection 247. Second edge server 240 may therefore correspond in general architecture to edge processing function 130 of FIG. 1B. However, as well as temperature sensors, there are many other examples of external devices and capabilities that might instead or additionally be connected.

Third edge server 250 links to cloud computing system 225 via third connection 252. No separate devices or sensors are attached to third edge server 250. This situation could arise for one of several reasons. It is possible that there are no separate devices connected to third edge server 250, for example, when there are devices that should connect to third edge server 250 by WiFi but they are out of range. Alternatively, the devices may not yet be installed or deployed. In a further alternative, there are applications that could run on third edge server 250 without any connected devices at all, because, for example, all the capabilities required could be integrated into third edge server 250.

Each external device 232, 234, 242, 244, 246 can be connected to its edge server in a number of different ways. Connections 233, 235, 243, 245 and 247 may be wired connections, for example Ethernet or USB connections, or may be wireless connections, for example WiFi or Bluetooth etc. Each of first edge server 230, second edge server 240 and third edge server 250 will also be equipped with a processor, the standard of the processor being an example of the 'internal' capability of the particular edge server.

In accordance with the invention, application store 220 provides additional information together with or as part of each application that is downloaded to any of first edge server 230, second edge server 240 and/or third edge server 250. The additional information states what capabilities are required to run the application on any server. The additional information can either be sent in advance or with the application. The additional information can include, for example, the USB device <vendor>:<device> identifier for an external device connected to any server that is to run the application, together with capabilities required of that external device.

When an application is to be sent, for example, to first edge server 230, then first edge server 230 examines its own capabilities. As a result of that examination, first edge server 230 decides if it can support the application or not. The first edge server 230 then signals back to application store 220 to inform application store 220 whether first edge server 230 can accept, or has accepted, the download.

The additional information sent to first edge server 230 can specify capabilities required of first device 232 and/or second device 234 that are connected to first edge server 230. First edge server 230 examines both its own capability and the capability of any other devices that are connected to it, i.e. in this case first device 232 and/or second device 234. For any edge server to detect external devices, a service discovery algorithm can be run. The algorithm determines that there are devices of the appropriate type in the mesh of connected devices. A Domain Name System query, 'DNS query', can be made for an appropriate Service Record, 'SRV', together with a service discovery protocol that ensures that all devices connected to the edge server in the mesh are discovered.

To provide a specific illustrative example, in one embodiment an application requires a certain amount of memory to run the application. This would be an example of an internal capability that is required of an edge server. If the edge server does not have the required capability then it will signal back to application store 220 say that it cannot accept or has not accepted the download of the application.

Alternatively, an application may, for example, require that an edge server conforms to a certain security standard. For example, the edge server may be required to have a platform security block so that an application processor in the edge server can perform a secure boot. This is an example of an internal attribute in the edge server. Alternatively, the edge server might be required to support Near Field Communication (NFC) Reader functionality.

Another example of a required capability may be that the edge server has certain other devices, for example pressure sensors, connected to it. This would be an example of a capability of an external device connected to the edge server. If the devices connected to the edge server do not have the required capability, then the edge server will signal back to say that it cannot accept or has not accepted the download of the application.

Figure 3:
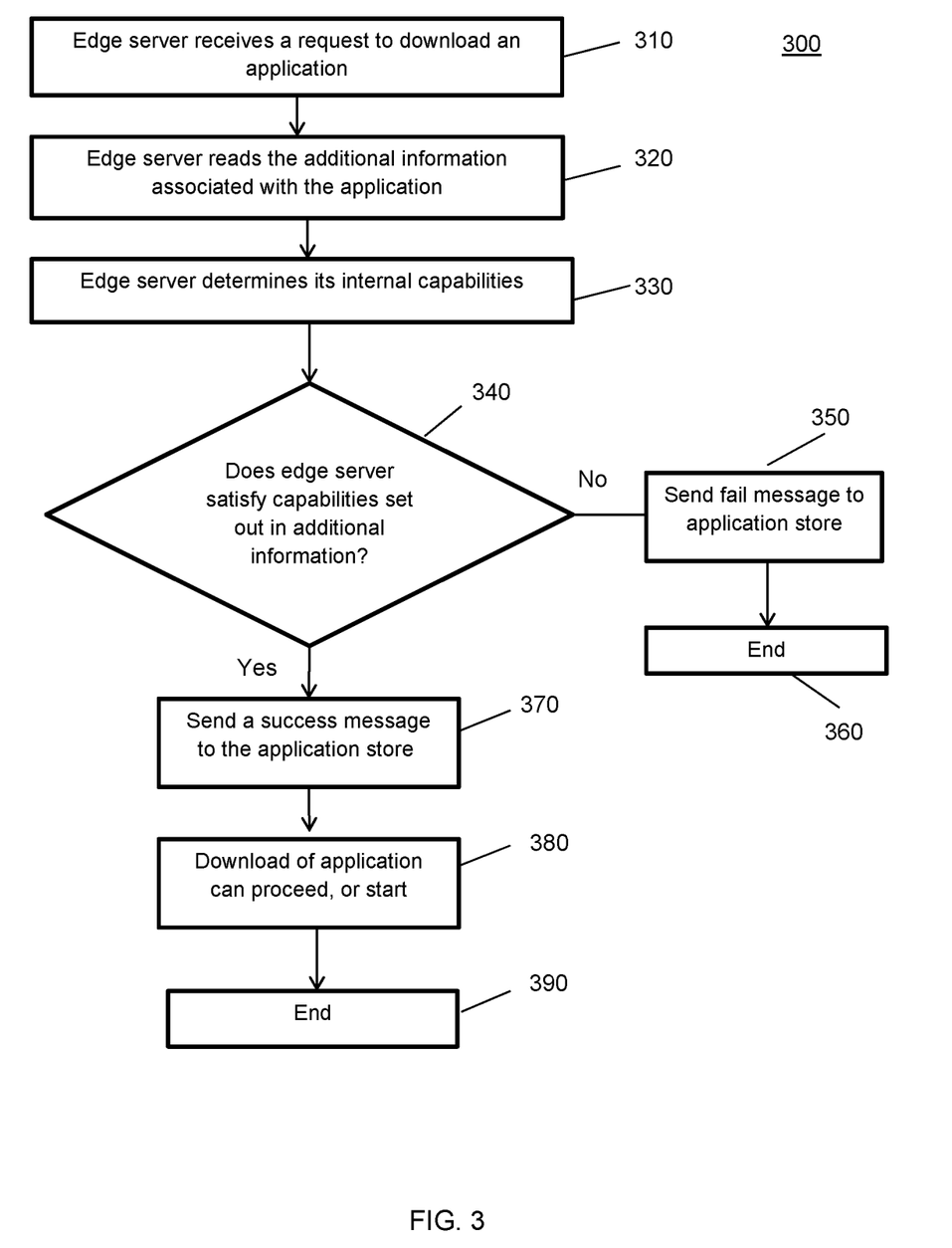
FIG. 3 provides a flow diagram of a method in accordance with an embodiment of the invention.

FIG. 3 is a flow diagram of a method 300 of operation of an edge server in accordance with an embodiment of the invention. In the discussion below, the first edge server 230 will be assumed to be the edge server in which the method is implemented.

At step 310, first edge server 230 receives a request to download a particular application from application store 220. At step 320, first edge server 230 accesses and reads the additional information that is either sent ahead of, or along side, the application.

At step 330, first edge server 230 determines or checks its internal capabilities. An example of an internal capability is memory capacity of first edge server 230, but there are other examples.

In decision box 340, first edge server 230 assesses whether first edge server 230 satisfies the capabilities that are specified in the additional information. If the answer is 'No', then at step 350, first edge server 230 sends a fail message to application store 220. Then at step 360, the method ends.

If the answer from decision box 340 is 'Yes', then the method proceeds to step 370. At step 370, first edge server 230 sends a success message to application store 220. At step 380, first edge server 230 starts to, or continues to, download the application. If the application had been downloaded, for example in either step 310 or step 320, then at step 380 first edge server 230 starts the application. Then at step 390, the method ends.

Instead of ending at method steps 360 or 390, method 300 could instead loop back to step 310. This would allow the download of other applications to first edge server 230, or to other edge servers such as second edge server 240 or third edge server 250.

Figure 4:
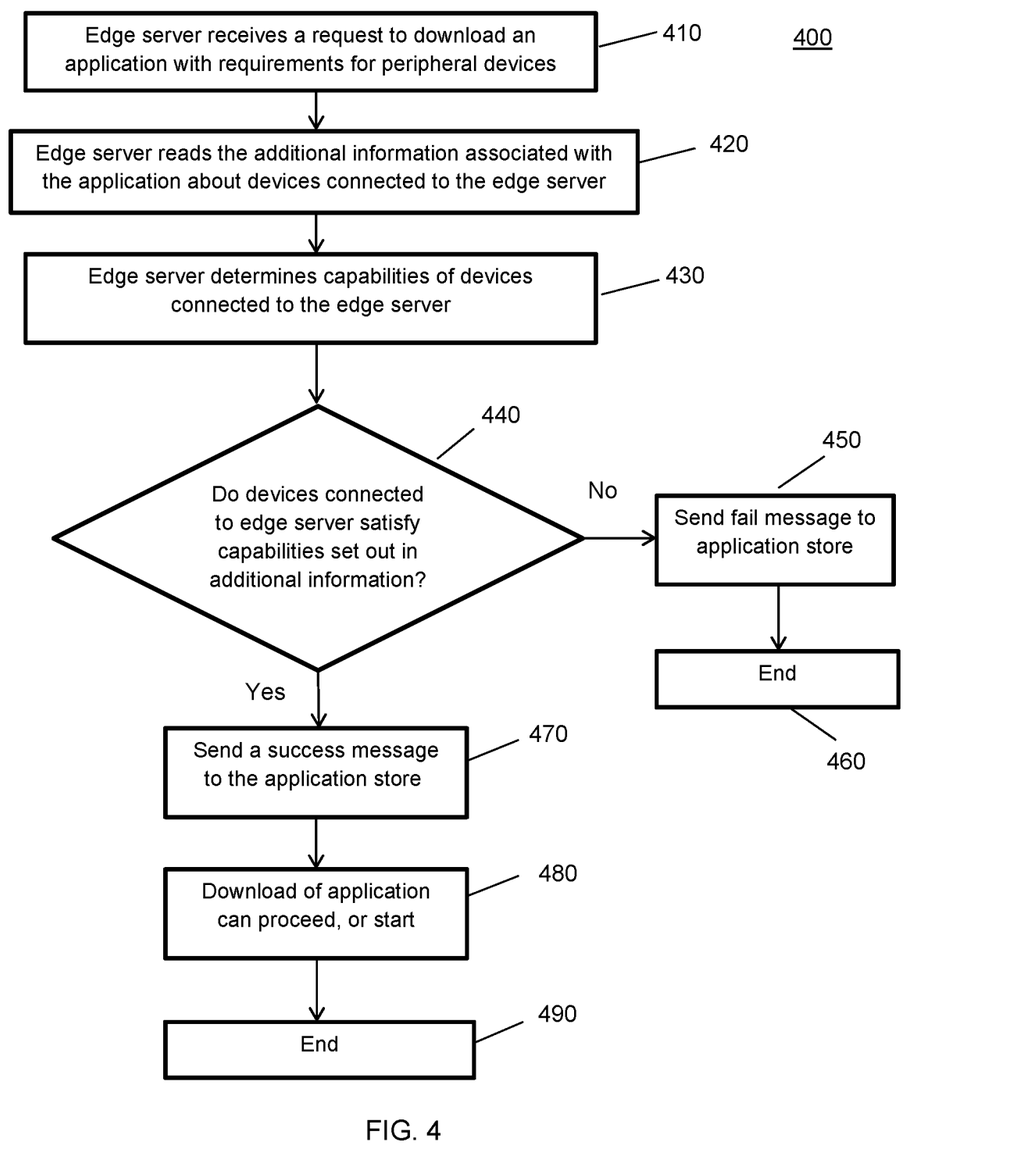
FIG. 4 provides a flow diagram of a method in accordance with another embodiment of the invention.

FIG. 4 is a flow diagram of a method 400 of operation of an edge server in accordance with another embodiment of the invention. In the discussion below, the first edge server 230 will be assumed to be the edge server in which the method is implemented. The method 400 may occur instead of, or together with, the method 300 of FIG. 3.

At step 410, first edge server 230 receives a request to download a particular application from application store 220. The application is one that has particular requirements for the existence and capabilities of one or more devices connected to first edge server 230. At step 420, first edge server 230 accesses and reads the additional information that is either sent ahead of, or along side, the application.

At step 430, first edge server 230 determines the capabilities of devices to which first edge server 230 is connected. In decision box 440, first edge server 230 assesses whether the devices to which first edge server 230 is connected satisfy the capabilities that are specified in the additional information, i.e. devices such as, for example, first sensor device 232 and second sensor device 234. If the answer is 'No', then at step 450, first edge server 230 sends a fail message to application store 220. Then at step 460, the method ends.

If the answer from decision box 440 is 'Yes', then the method proceeds to step 470. At step 470, first edge server 230 sends a success message to application store 220. At step 480, first edge server 230 starts or continues to download the application. If the application had been downloaded, for example in either step 410 or step 420, then at step 480 first edge server 230 starts the application. The application then works with first edge server 230 and the devices to which first edge server 230 is connected, such as for example first sensor device 232 and second sensor device 234. Then at step 490, the method ends.

Instead of ending at method steps 460 or 490, method 400 could instead loop back to step 410. This would allow the download of other applications to first edge server 230, or to other edge servers such as second edge server 240.

As third edge server 250 is not connected to any other devices, method 400 may not be necessary at all for edge server 250. Alternatively, method 400 may be performed and simply result in the decision that an absence of devices connected to third edge server 250 means that the requirements for capabilities of connected devices clearly cannot be met.

The methods 300 and 400 may occur together, in which case the additional information will specify necessary conditions for both an edge server and the devices connected to that edge server. Thus, in summary, the capability of an edge server such as first edge server 230 or second edge server 240 to run an application could depend upon: (i) internal capabilities of the edge server itself; and/or (ii) capabilities of devices that are connected to the edge server, i.e. external capabilities.

The additional information can either be provided in advance of the application, or as 'side information' together with the application. The additional information lists all the capabilities that are required for the application to run, whether those are 'internal' capabilities of the first edge server itself or 'external' capabilities of the devices that are connected to the edge server. The edge server is either pre-programmed or can calculate its own capabilities, and therefore is in a position to judge whether it can accept a download of an application.

Each application in application store 220 can be tagged with USB vendor or device information, or with a list of such tags. The result is that the applications in application store 220 are 'pre-loaded' with information that can be employed each time the application is to be sent to any of possibly hundreds of edge servers. If the answer sent back at step 350 or step 450 from any edge server is a fail message, then the system knows that the particular application could not be added to the particular edge server. There is thus no requirement that application store 220 or the system have an up-to-date inventory of the specification of the particular edge server. There is also no requirement that application store 220 or the system have an up-to-date list of devices that are connected to the particular edge server, which is information that may change rapidly.

Figure 5A:
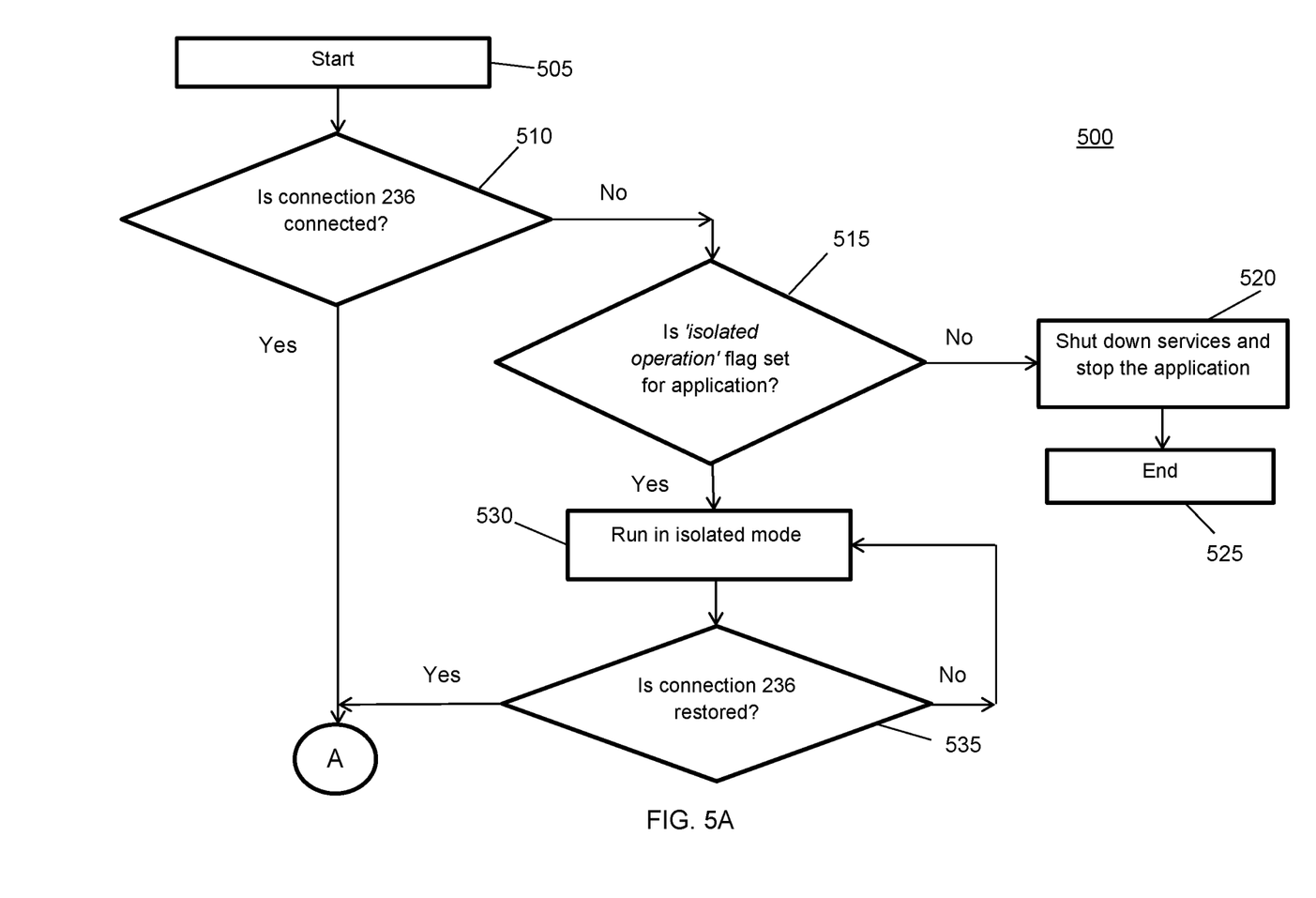
FIGS. 5A and 5B provide a flow diagram of a method 500 of operation of an edge server in accordance with another embodiment of the invention.
Figure 5B:
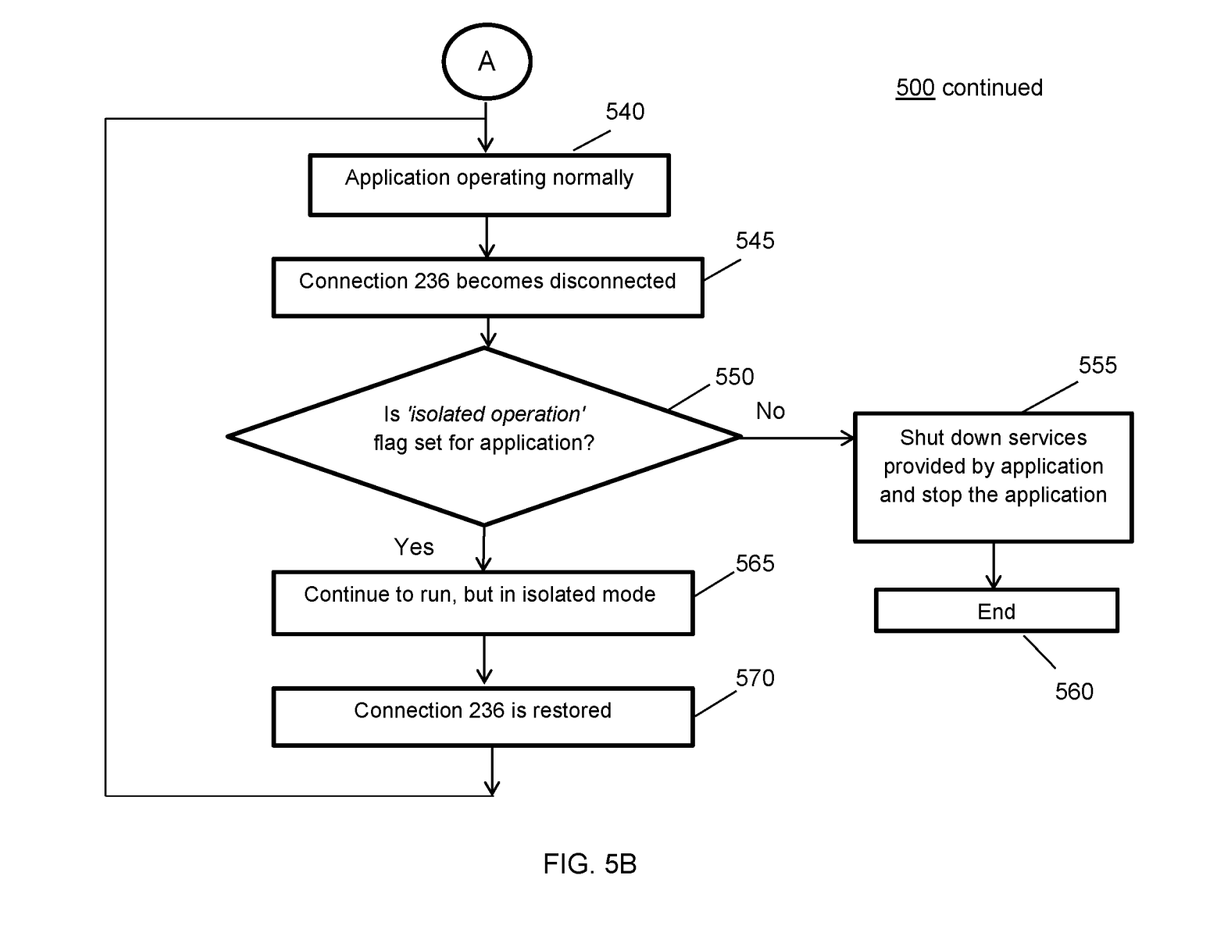

FIGS. 5A and 5B present a flow diagram of a method 500 of operation of an edge server in accordance with another embodiment of the invention. Method 500 is split up for purposes of illustration into: (i) Steps 505-535 ahead of point A, which form FIG. 5A; and (ii) Steps 540-570, which form FIG. 5B. The method 500 addresses the second problem identified earlier, which is to enable an edge server to know whether a particular application that has been downloaded to the edge server is capable of starting or continuing to run in isolation, i.e. where the backhaul connection, i.e. first connection 236, to the cloud computing system 225 is not available.

In accordance with the method 500, a flag or parameter is associated with the application that is downloaded to the edge server. This flag indicates if the application has the capacity to run in isolation or not. Thus the capability for that particular application is determined in advance and is sent with the application. Once again, the applications in application store 220 are 'pre-loaded' with information that can be employed each time the application is sent to any of possibly hundreds of edge servers.

In the discussion of the method of FIGS. 5A and B below, the first edge server 230 will be assumed to be the edge server in which the method is implemented, and the first connection 236 will be considered as the connection that may temporarily become unavailable.

When first edge server 230 starts up in isolation, it will immediately know whether particular applications, and hence particular services, should be started or not. Similarly, if first connection 236 becomes disconnected while the application is in operation, then first edge server 230 will know whether or not to continue running services provided by that application.

The method 500 shows both the cases when: (i) the network backhaul, i.e. first connection 236, is already disconnected when the application starts; and also (ii) the network backhaul becomes disconnected while the application is already running normally.

At step 505, method 500 starts. At step 510, a decision is made whether or not first connection 236 is available. If the answer is 'Yes', then method 500 moves to point 'A', and then to the steps in FIG. 5B.

When the answer in step 510 is 'No', method 500 moves to step 515, where a decision is made about whether an application that is running has a flag set. The flag indicates whether 'isolated operation' of that application is possible. If the flag is set, then at step 530 the application continues to run and method 500 moves to decision box 535. Decision box 535 returns to box 530 until the first connection 236 has been restored, at which point method 500 moves to point A.

It the flag is not set in box 515, then at step 520 the services provided by the application are shut down and the application is stopped. At step 525, method 500 then ends.

Moving to step 540 in FIG. 5B, the application is running normally. At step 545, a situation arises whereby first connection 236 is no longer available. At decision 550, the 'isolated operation' flag for the application is checked. If it is set for the application, then at step 565 the application continues to run. At step 570, first connection 236 is restored, and the method loops back to step 540.

If at decision 550 the flag is not set for the application, then at step 555 the services provided by the application are shut down and the application is stopped. At step 560, method 500 then ends.

In each of steps 515 and 550, method 500 may check flags for multiple applications. Depending on the outcome of steps 515 and 550, some of the applications may stop, whilst others can start or continue. Although steps 515 and 550 refer to one 'isolated operation' flag, there may be two different flags for each application. One flag may indicate whether or not an application can start, when first connection 236 is not available. The other flag may indicate whether or not an application can continue to operate when first connection 236 becomes unavailable.

Figure 6:
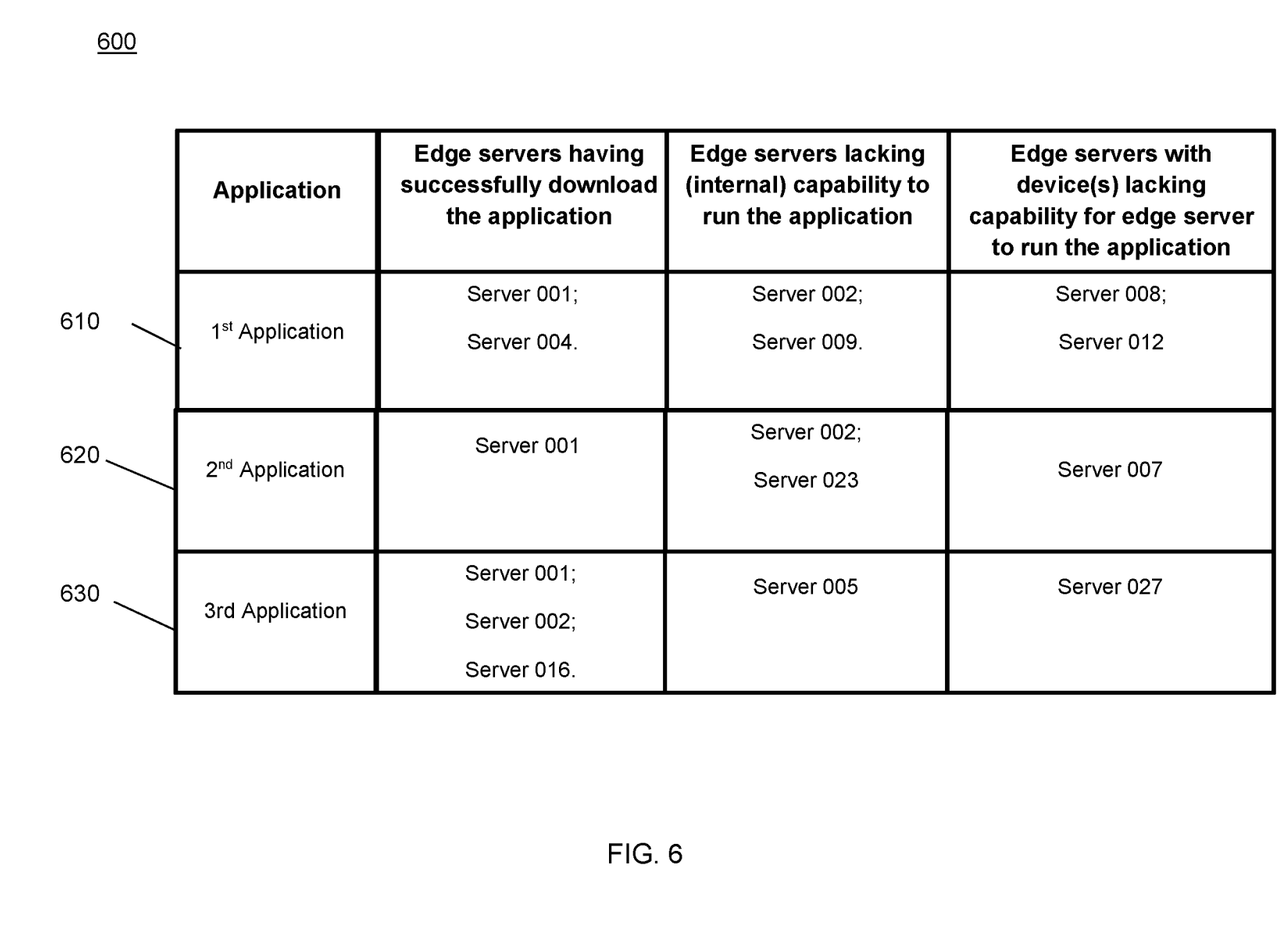
FIG. 6 provides an illustration of a table that may be maintained in an application store in accordance with an embodiment of the invention.

FIG. 6 provides an illustrative example of a first table 600 that may be maintained in application store 220.

Each row in table 600 relates to a different application in application store 220. Successive entries in row 610 indicate, for the first application, the edge servers that have:
(iii) Successfully downloaded the first application;
(iv) Indicated that they lack the capability specified in the additional information to run the first application;
(v) Indicated that they are connected to one or more devices that lack the capability specified in the additional information to allow the edge server to run the first application.

Successive entries in row 620 indicate corresponding information received from edge servers that have attempted to download the second application. Successive entries in row 630 indicate corresponding information received from edge servers that have attempted to download the third application.

So in the numerical example of table 600:

(vi) Edge servers with serial numbers 001 and 004 have successfully downloaded the first application.

(vii) The edge server with serial number 002 has sought to download the first application, but lacked the capability required within itself. The edge server with serial number 009 has sought to download the first application, but lacked the capability required within itself.

(viii) The edge server with serial number 008 has sought to download the first application, but at least one device connected to the edge server with serial number 008 lacked the capability required for the first application to run on the edge server with serial number 008. The edge server with serial number 012 has sought to download the first application, but at least one device connected to the edge server with serial number 012 lacked the capability required for the first application to run on the edge server with serial number 012.

Thus table 600 provides part of a method for downloading applications to edge servers from application store 220 through a cloud computing system. Firstly, the method comprises the application store 220 providing additional information with each application to be downloaded, the additional information indicating capabilities required of an edge server and/or of devices connected to the edge server, for the application to be able to run on the edge server. Secondly, application store 220, for each application that application store 220 has attempted to download, maintains:
a) a first record of edge servers that have successfully downloaded the application;
b) a second record of edge servers that indicated that they lack the capability specified in the additional information to run the application; and
c) a third record of edge servers that indicated that they are connected to one or more devices that lack the capability specified in the additional information to allow the edge server to run the application.

Figure 7:
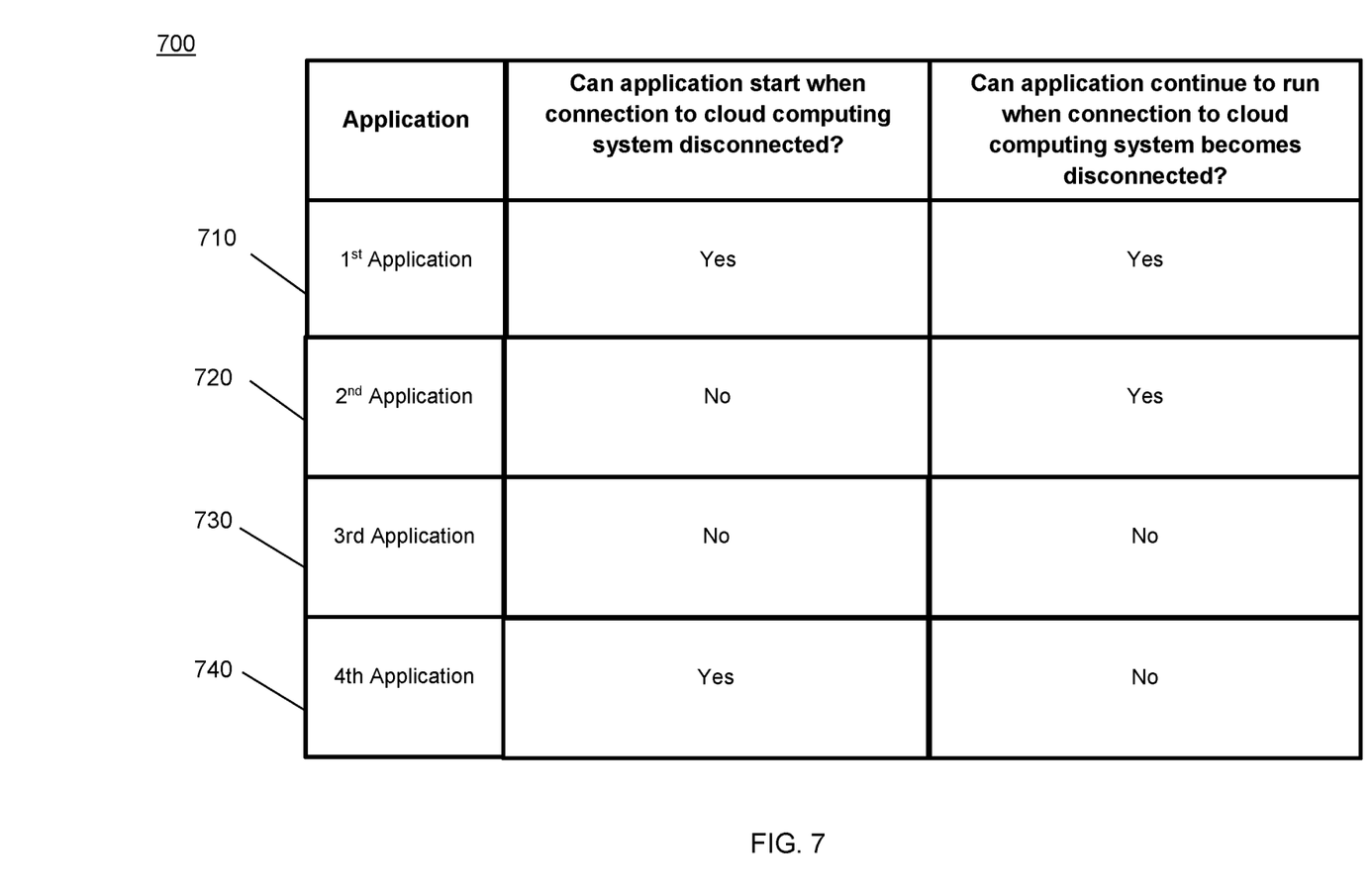
FIG. 7 provides an illustration of a table that may be maintained in an edge server in accordance with an embodiment of the invention.

FIG. 7 provides an illustration of a second table 700 that may be maintained in an edge server in accordance with an embodiment of the invention.

Each row in table 700 relates to a different application that the edge server has downloaded from application store 220. Successive entries in row 710 indicate, for the first application, whether:
(i) The first application can start at a time when the backhaul connection from the edge server to the backend server 250 via cloud computing system 225 is disconnected;
(ii) The first application can continue to run when the backhaul connection from that edge server to the backend server 250 via cloud computing system 225 becomes disconnected. Successive entries in rows 720, 730 and 740 indicate corresponding information for the second, third and fourth applications respectively.

In the exemplary table 700, for example:
(i) The first application can start when the backhaul connection is disconnected, and can continue when the backhaul connection becomes disconnected;
(ii) The second application cannot start when the backhaul connection is disconnected, but can continue when the backhaul connection becomes disconnected.

In an alternative embodiment of table 700, each row may just hold the 'isolated operation' flag referred to in steps 515 and 550 of method 500.

The edge server that creates table 700 is thus maintaining a first record of applications that can start to run when the edge server is already disconnected from the cloud computing system, and maintaining a second record of applications that can continue to run when the edge server becomes disconnected from the cloud computing system. When the edge server is already disconnected from the cloud computing system, the edge server checks the first record and only starts an application in response to a request to start the application, if the first record indicates that the application can start. When the edge server becomes disconnected from the cloud computing system, the edge server checks the second record and closes those applications that cannot continue to run when the edge server becomes disconnected.

Figure 8:
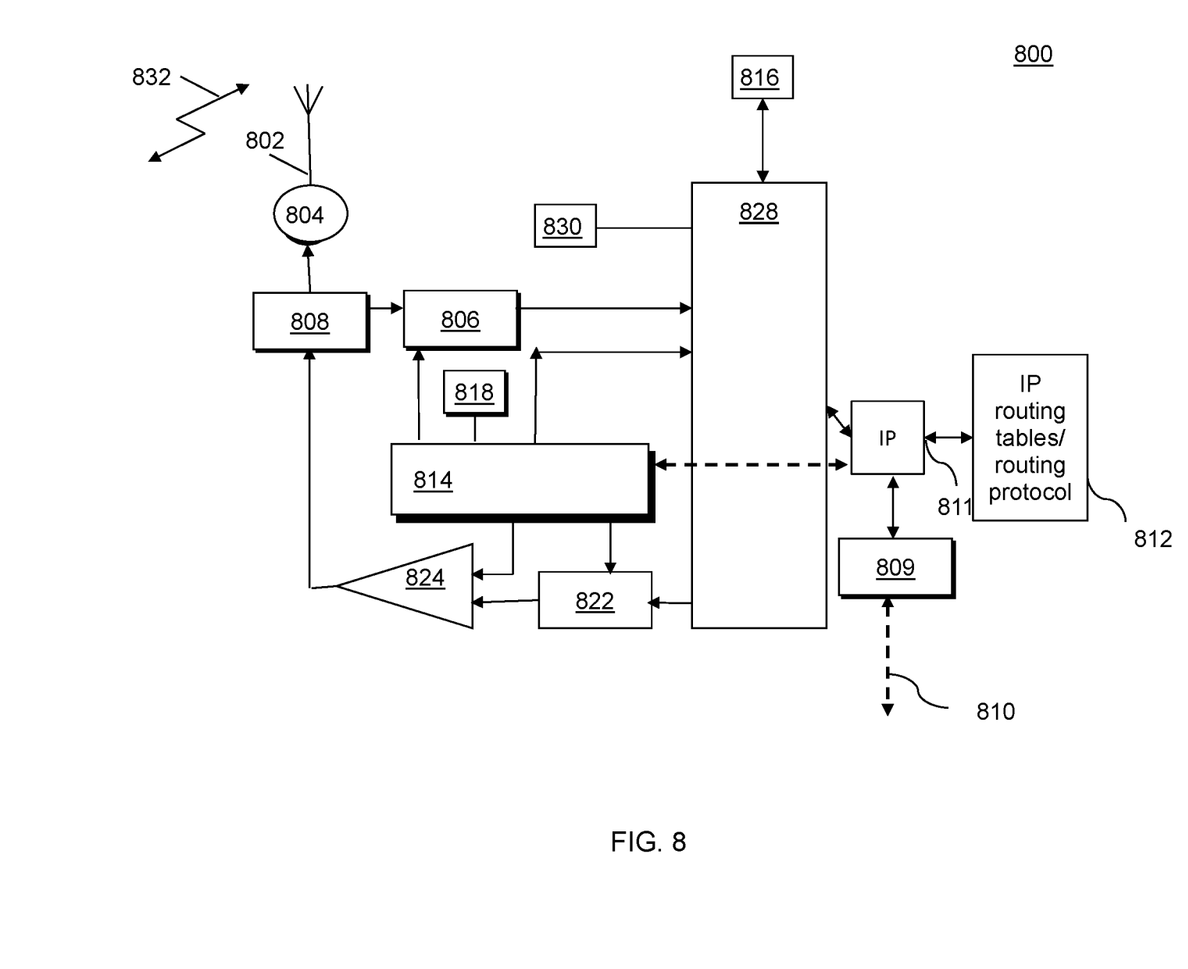
FIG. 8 illustrates a practical embodiment of an edge server that is wirelessly connected to sensors or other devices.

FIG. 8 illustrates one practical embodiment of an edge server that is wirelessly connected to sensors or other devices. Edge server 800 is an example of an edge server being modified by the functionality herein described, in accordance with embodiments of the invention. In example embodiments of the invention, edge server 800 has been modified with the addition of functionality as described with reference to FIGS. 2-7.

In practice, purely for the purposes of explaining embodiments of the invention, the edge server 800 is described in terms of both a wireless communication device and a wireline connected device, such as a computer, network server, laptop, etc. In a wireless sense, the edge server 800 contains one or more antenna(e) 802 for communicating via various wireless technologies. In one example, the one or more antenna(e) 802 (coupled via a wireless interface 808 with associated transmit and receive circuitry) is configured to radiate and receive radiated signals 832, for example, on WiFi™ frequencies or bluetooth BT™ frequencies or cellular frequencies, e.g. LTE™ over a cellular network (not shown). Battery 830 supplies power to signal processor 828. Although not shown in FIG. 8, battery 830 may supply all components of edge server 800, when edge server 800 is a portable device such as a laptop.

In a wireless example, the one or more antenna(e) 802 is coupled to an antenna switch or duplexer 804 that provides isolation between receive and transmit chains within the edge server 800, as well as providing isolation between circuits targeted for the specific technologies being supported, e.g. LTE™, WiFi™, BT™. One or more receiver chains, as known in the art, include receiver front-end circuitry 806, thereby effectively providing reception, filtering and intermediate or base-band frequency conversion. The receiver front-end circuitry 806 is coupled to signal processor 828, which is for example realized by a digital signal processor (DSP).

A skilled artisan will appreciate that the level of integration of receiver circuits or components may be, in some instances, implementation-dependent. A controller 814 maintains overall operational control of the edge server 800. The controller 814 is also coupled to the receiver front-end circuitry 806 and the signal processor 828. Signal processor 828 is connected to a memory 816, which also serves as a memory of controller 814. Memory 816 may store information such as table 700 of FIG. 7. A timer 818 is operably coupled to the controller 814 to control the timing of operations, e.g. transmission or reception of time-dependent signals, within the edge server 800.

In this example, controller 814 is connected to an internet protocol (IP) circuit/function 811, which is coupled to one or more IP routing tables and/or routing protocol software 812. In a wireline example, the controller 814 may be operably coupled to other devices and nodes via a wireline interface 809 using a wireline connection 810, such as Ethernet. However, signal processor 828 of edge server 800 encompasses much more functionality than the IP circuit/function 811 and IP routing tables and/or routing protocol software 812.

Thus, methods and apparatus for improving the reliability and performance of an edge computing system have been described, where the aforementioned disadvantages with prior art arrangements have been substantially alleviated.

It will be further appreciated that, for clarity purposes, the described embodiments of the invention with reference to different functional units and processors may be modified or re-configured with any suitable distribution of functionality between different functional units or processors, without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. For example, the software may reside on non-transitory computer program product comprising executable program code to increase coverage in a wireless communication system.

Thus, the elements and components of an embodiment of the invention may be physically, functionally and logically implemented in any suitable way. Indeed, the functionality may be implemented in a single unit, in a plurality of units or as part of other functional units. Those skilled in the art will recognize that the functional blocks and/or logic elements herein described may be implemented in an integrated circuit for incorporation into one or more of the communication units.

Furthermore, it is intended that boundaries between logic blocks are merely illustrative and that alternative embodiments may merge logic blocks or circuit elements or impose an alternate composition of functionality upon various logic blocks or circuit elements. It is further intended that edge computing system 200 and its elements depicted herein are merely exemplary, and that in fact many other edge computing systems and elements or architectures can be implemented that achieve the same functionality.

Although the present invention has been described in connection with some example embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

The invention claimed is:

1. An edge computing system, comprising:
    an application store running on a backend server;
    an edge server, operably coupled to the application store, the edge server configured to:
        receive additional information related to an application to be run on the edge server from the application store, the additional information defining hardware capabilities required for the application to run on the edge server;
        determine whether the edge server has the hardware capabilities required to run the application;
        indicate to the application store that the edge server does not have the hardware capabilities required to run the application, when the edge server does not have the hardware capabilities required to run the application; and
        indicate to the application store that the edge server has the hardware capabilities required to run the application, when the edge server has the hardware capabilities required to run the application; and
        download the application to the edge server.

2. The edge computing system of claim 1, further comprising:
    at least one device connected to the edge server;
    the additional information defining hardware capabilities of the at least one device connected to the edge server required for the application to run on the edge server;
    the edge server being configured to:
        determine whether the at least one device has the hardware capabilities required for the application to run;
        indicate to the application store that the at least one device has the hardware capabilities required for the application to run, when the at least one device has the hardware capabilities required for the application to run; and
        indicate to the application store that the at least one device does not have the hardware capabilities required for the application to run, when the at least one device does not have the hardware capabilities required for the application to run.

3. The edge computing system of claim 2, further comprising the edge server being configured to: complete download of the application, when the at least one device has the hardware capabilities required for the application to run on the edge server.

4. The edge computing system of claim 1, further comprising the edge server being configured to:
    complete download of the application, in response to the edge server having determined that it has the hardware capabilities required for the application to run on the edge server; and reject the download of the application, in response to the edge server having determined that it does not have the hardware capabilities required for the application to run on the edge server.

5. The edge computing system of claim 1, wherein a cloud computing system comprises the backend server, the edge computing system further comprising the edge server being configured to:
   maintain a first record of applications that can start to run when the edge server is disconnected from the cloud computing system;
   maintain a second record of applications that can continue to run when the edge server becomes disconnected from the cloud computing system;
   when the edge server is disconnected from the cloud computing system, check the first record and only start the application in response to a request to start the application, if the first record indicates that the application can start; and
   when the edge server becomes disconnected from the cloud computing system, check the second record and close applications that cannot continue to run when the edge server becomes disconnected.

6. An application store, the application store configured to:
   store an application for download to at least one edge server over a cloud computing system;
   store additional information for the application, the additional information related to an application to be run on the edge server and comprising hardware capabilities required of the at least one edge server in order for the at least one edge server to run the application;
   send the additional information to the at least one edge server, either before or at the same time as sending the application to the at least one edge server; and
   receive an indication from the at least one edge server whether or not the at least one edge server has the hardware capabilities required to run the application.

7. The application store of claim 6, wherein the application store is further configured to:
   store further additional information for the application, the further additional information comprising hardware capabilities required of at least one device connected to the at least one edge server in order for the at least one edge server to run the application; and
   receive an indication from the at least one edge server whether or not the at least one device has the hardware capabilities required in order for the edge server to run the application.

8. The application store of claim 7, the application store further configured to maintain a register of:
   a) edge servers that have successfully received applications from the application store, and the applications downloaded to those edge servers;
   b) edge servers that have indicated that the at least one device does not have the hardware capabilities required to run applications.

9. The application store of claim 6, the application store further configured to: complete download of the application to the at least one edge server over the cloud computing system, when the indication is that the at least one edge server has the hardware capabilities required to run the application.

10. The application store of claim 6, the application store further configured to maintain a register of:
   a) edge servers that have successfully received applications from the application store, and applications downloaded to those edge servers;
   b) edge servers that have indicated that they do not have the hardware capabilities required to run applications.

11. An edge server operably coupled to an application store and configured to:
   receive an application from the application store;
   receive additional information related to an application to be run on the edge server from the application store, the additional information defining hardware capabilities required for the application to run on the edge server;
   determine whether the edge server has the hardware capabilities required to run the application; and
   indicate to the application store whether the edge server does not have the hardware capabilities required to run the application, when the edge server does not have the hardware capabilities required to run the application; and
   indicate to the application store that the edge server has the hardware capabilities required to run the application, when the edge server has the hardware capabilities required to run and download the application to the edge server.

12. The edge server of claim 11, further comprising:
   at least one device connected to the edge server, the additional information further defining hardware capabilities of the at least one device required for the application to run on the edge server; the edge server being configured to:
   a) determine whether the at least one device has the hardware capabilities required for the application to run;
   b) indicate to the application store whether the at least one device has the hardware capabilities required for the application to run.

13. The edge server of claim 12, further comprising the edge server being configured to: complete download of the application, when the at least one device has the hardware capabilities required for the application to run on the edge server.

14. The edge server of claim 11, further comprising the edge server being configured to: complete download of the application, when the edge server has the hardware capabilities required for the application to run on the edge server.

* * * * *